Patented May 22, 1945

2,376,841

UNITED STATES PATENT OFFICE 2,376,841

ANTIPRESSOR RENAL EXTRACT

Clarence M. Wolf, Reno, Nev.

No Drawing. Application April 21, 1941,
Serial No. 389,664

5 Claims. (Cl. 167—74)

This invention relates to a renal extract and the method of isolating it.

Investigators have recognized for many years the existence of hypertension in nephrectomized lower animals and humans possessing some condition effecting the humoral agency. It has further been recognized that the administration of certain substances derived from kidneys has tended to relieve hypertensive conditions. However, these substances have not been generally accepted for several reasons. The principal reason for this lack of interest has been the absence of convincing data regarding their clinical application. A further reason for this lack of acceptance has been due to the failure of earlier investigators to establish any logical reason for the use of such materials.

The results of recent research indicates that the kidney usually causes hypertension and that this condition is associated with derangement of the generation of certain substances in the kidney. It is believed, therefore, that normal renal tissue forms a substance which is distributed throughout the body and possesses the property of limiting the pressor effect of renin. Most recent observations have indicated that renal hypertension is dependent upon the ratio of ischemic to normal kidney tissue. In view of the foregoing observations it is now believed that the kidney provides some substance which acts as an inhibitor for certain agents, among others the renal pressor substance renin. Reference is made to the article by A. Grollman, J. R. Williams, Jr., and T. R. Harrison, in the Journal of the American Medical Association, vol. 115, No. 14, page 1169, which contains a history of renal extracts and a summary of some of the experimental work in this field.

It is therefore, the object of this invention to provide a renal extract of the class of conjugated proteins capable of reducing blood pressure below normal.

Another object of the invention is to provide a renal extract capable of relieving at least temporarily, disorders due to impaired arterial supply.

A further object of this invention is to provide a renal extract which is entirely non-toxic.

Still another object of this invention is to provide a renal extract which may be administered either orally or intravenously.

A still further object of this invention is to provide a simple process of efficiently extracting and purifying a renal extract.

The invention contemplates the extraction of a renal substance from kidneys of freshly killed animals. The kidney of any freshly killed animal may be employed, as for example, pig, sheep, lamb, etc. Owing to the convenience in procuring them, pig and lamb kidneys have been employed in isolating the renal substance of this invention. The extract may be prepared by the following procedure.

Kidneys immediately upon removal from freshly killed hogs or lambs are finely ground and placed in 0.25 N hydrochloric acid solution. Approximately two liters of acid solution are used with three pounds kidney. The mixture is allowed to stand with occasional stirring, for at least twelve hours. The mixture is then pressed through a cloth and the residual glandular material again extracted with the aqueous acid solution and pressed. The insoluble glandular residue is discarded and the extracts combined for further treatment.

The combined acid extracts are carefully neutralized with 5 N sodium hydroxide to a pH of 4 to reduce the amount of inert protein. The mixture is filtered through cloth giving a clear yellow solution which is then acidified to a pH of 2 to 5. From about 1.5 to 3 volumes of a saturated solution of ammonium sulphate is added to the filtrate and the mixture is then placed in an icebox for twenty-four hours. The temperature of the icebox is not permitted to exceed 35° F. The precipitate obtained by this salting-out step is collected on a Pratt-Dumass filter and permitted to drain.

The precipitate recovered contains the active principle but is very toxic and if administered in an amount sufficient to produce a chemotherapeutic result will cause death to a rat.

In order to concentrate the active principle, the crude precipitate is extracted five times with 50% aqueous acetone, filtering after each extraction. The filtrates are then combined and the acetone solvent completely removed by the open pan method for removing organic solvents. During this process a lipoidal mass is deposited which is discarded. The aqueous solution is thereupon chilled and filtered, producing a clear dark brown solution. This solution is neutralized with 0.1 N sodium hydroxide and thereafter treated with saturated ammonium sulphate solution as above. The precipitate obtained comprises the active principle in a highly purified state and requires no further treatment. It is non-toxic and may be administered either orally or dissolved in normal saline solution for intravenous use. The rat unit method is employed for standardization.

The renal extract of this invention is enzymatic in character and functions like a tryptic catalytic agent. Its structural formula therefore cannot be determined. However, it has been ascertained that the extract is a hetero-albumose and a conjugated protein. The composition contains both amino and carboxylic groups and is basic in character. It has been determined from potentiometric titrations that the isoelectric point of the extract occurs at a pH of 11. It was calculated from the results of potentiometric titrations that the extract contains one milliequivalent of amino groups per gram and four milliequivalents of carboxyl groups per gram. The results of an analysis of the elementary composition of the extract are as follows:

| | Per cent |
|---|---|
| Carbon | 47.6 |
| Hydrogen | 7.4 |
| Nitrogen | 13.4 |
| Sulphur | 2.6 |
| Sodium | 3.0 |
| Oxygen | 26.0 |
| | 100.0 |

The results of the clinical application of the renal extract of this invention in over sixty-five cases indicate a great improvement in each case. It has been sought to demonstrate the improvement in each case by methods of precision of demonstrable recordings. It has not been necessary therefore, to rely upon the statements of the patient as to well being or upon blood pressure readings alone.

A retinoscopic examination was conducted in each case to visualize the retinal arteries and it was observed that in each case in which the renal extract was administered a definite improvement was noted not only by the patient but in the visual characteristics of the retinal vessels.

Acknowledgement is made of the work of Arthur Grollman, J. R. Williams, Jr., and Tinsley R. Harrison reported in their article appearing in the Journal of Biological Chemistry, June, 1940, page 115. The method employed by these investigators is similar in many respects to the method disclosed herein. There are, however, variations between the process disclosed in the above article and that herein described which result in the isolation of totally unrelated products. In the process disclosed by the above investigators it will be noted that the organic solvent is removed by a vacuo process. It has been found that even though the temperature is maintained at a low degree, a different end product is obtained. Furthermore, the above authors employ charcoal as a decolorizing agent. It has been found that charcoal absorbs an active agent capable of reducing diastolic blood pressure below normal. The renal extract of this invention is capable of reducing the blood pressure of the patent below normal or the tolerance of the patient whereas the antipressor disclosed in the article will reduce blood pressure to normal only. Finally, it is brought out in the article that the antipressor is non-protein in character. On the contrary, as has been previously established herein, the renal extract of this invention is a hetero-albumose and conjugated protein possessing the properties of a tryptic catalytic enzyme.

I claim as my invention:

1. A process of isolating a hetero-albumose renal extract of the class of conjugated proteins consisting in the steps of grinding kidneys of freshly killed animals, incorporating the kidneys with 0.25 N hydrochloric acid in the ratio of two liters of acid solution to about three pounds of kidneys, allowing the mixture to stand for about twelve hours and then filtering the mixture, further extracting the residual glands with aqueous acid solution and filtering the second mixture, combining the filtrates from each of said extractions, neutralizing said acid extracts with 5 N sodium hydroxide to a pH of 4, filtering the mixture to remove inert material and acidifying the filtrate to a pH of 2 to 5, adding from 1.5 to 3 volumes of a saturated solution of ammonium sulphate to the filtrate and chilling the mixture at a temperature of not over 34° F. for about twenty-four hours to precipitate out the crude product, filtering the mixture to recover the precipitate, extracting the precipitate with 50% aqueous acetone to concentrate the active principle, removing the acetone by the open pan method, filtering the mixture with an inert filtering medium to remove lipoidal inert material, chilling the filtrate and neutralizing the filtrate with 0.1 N sodium hydroxide, reprecipitating the active principle with a saturated solution of ammonium sulphate and thereafter recovering the precipitate comprising a hetero-albumose of the class of conjugated proteins.

2. A process of isolating a hetero-albumose renal extract of the class of conjugated proteins as set forth in claim 1 wherein the kidneys employed are from freshly killed hogs.

3. A process of isolating a hetero-albumose renal extract of the class of conjugated proteins as set forth in claim 1 wherein the kidneys employed are from freshly killed lambs.

4. A process of isolating a hetero-albumose renal extract of the class of conjugated proteins consisting in the steps of grinding kidneys of freshly killed hogs, incorporating the kidneys with 0.25 N hydrochloric acid in the ratio of two liters of acid solution to about three pounds of kidneys, allowing the mixture to stand for about twelve hours and then filtering the mixture, further extracting the residual glands with aqueous acid solution and filtering the second mixture, combining the filtrates from each of said extractions, neutralizing said acid extracts with 5 N sodium hydroxide to a pH of 4, filtering the mixture to remove inert material and acidifying the filtrate to a pH of 2, adding about 1.5 volumes of a saturated solution of ammonium sulphate to the filtrate and chilling the mixture at a temperature of not over 34° F. for about twenty-four hours to precipitate out the crude product, filtering the mixture to recover the precipitate, extracting the precipitate with 50% aqueous acetone to concentrate the active principle, removing the acetone by the open pan method, filtering the mixture with an inert filtering medium to remove lipoidal inert material, chilling the filtrate and neutralizing the filtrate with 0.1 N sodium hydroxide, reprecipitating the active principal with a saturated solution of ammonium sulphate and thereafter recovering the precipitate comprising a hetero-albumose of the class of conjugated proteins.

5. A renal extract characterized by the property of reducing blood pressure to below normal consisting of a hetero-albumose of the class of conjugated proteins having an isoelectric point of a pH of 11, one milliequivalent of amino groups per gram, four milliequivalents of carboxyl groups per gram and an elementary composition of

| | Per cent |
|---|---|
| Carbon | 47.6 |
| Hydrogen | 7.4 |
| Nitrogen | 13.4 |
| Sulphur | 2.6 |
| Sodium | 3.0 |
| Oxygen | 26.0 |

CLARENCE M. WOLF.